United States Patent
Garcia et al.

[11] Patent Number: 5,713,229
[45] Date of Patent: Feb. 3, 1998

[54] SECURITY DEVICE FOR STEERING WHEEL

[76] Inventors: Adolfo Garcia; Rony Lemus; Enrique Garcia, all of 5232 Live Oak St., Cudahy, Calif. 90201

[21] Appl. No.: 689,485

[22] Filed: Aug. 8, 1996

[51] Int. Cl.⁶ ............................................. B60R 25/02
[52] U.S. Cl. .................................. 70/209; 70/226; 70/237
[58] Field of Search ............................ 70/209–212, 225, 70/226, 237, 238, 416, 417

[56] References Cited

U.S. PATENT DOCUMENTS

| | | | |
|---|---|---|---|
| 2,575,401 | 11/1951 | Simmons | 70/211 |
| 4,699,238 | 10/1987 | Tamir | 70/238 |
| 4,738,127 | 4/1988 | Johnson | 70/209 |
| 4,949,561 | 8/1990 | Selow et al. | 70/226 X |
| 5,007,259 | 4/1991 | Mellard | 70/209 |
| 5,022,246 | 6/1991 | Wang | 70/209 |
| 5,052,201 | 10/1991 | Liou | 70/209 |
| 5,119,651 | 6/1992 | Yang | 70/209 X |
| 5,197,308 | 3/1993 | Pazik | 70/226 X |
| 5,199,284 | 4/1993 | Lin | 70/209 |
| 5,267,458 | 12/1993 | Heh | 70/238 |
| 5,284,037 | 2/1994 | Chen et al. | 70/209 |
| 5,327,753 | 7/1994 | White | 70/209 |
| 5,329,793 | 7/1994 | Chen | 70/209 X |
| 5,557,957 | 9/1996 | Wyman | 70/209 |

*Primary Examiner*—Suzanne Dino

[57] ABSTRACT

A security device for a steering wheel is disclosed. Such device comprises at least one elongated primary rod positioned in contact with the upper surface of a steering wheel adjacent to one side thereof at a first location. The device includes an L-shaped member extending radially inward with respect to the position of contact with respect to the steering wheel. The L-shaped member includes a downwardly extending portion and a radially outboardly extending portion, the rod having an enlarged handle at its radially outboard end. An intermediate support has a pair of support barrels with a first end attached to the inboard end of the primary rod and a cross piece coupling the support barrels. Each support barrel has a second end with a cylindrical bore. A pair of similarly shaped independent secondary rods is provided, each formed with a plurality of concentric circumferential recesses. Each secondary rod is positionable within an associated bore of the barrels, each rod having at its outboard end a fork-shaped member with upper and lower parallel fingers for spanning the upper and lower surfaces of the steering wheel at a second location diametrically opposed from the first location. A lock with an associated interference member to contact and secure an associated second rod in a locking orientation is also provided.

1 Claim, 3 Drawing Sheets

FIG 3
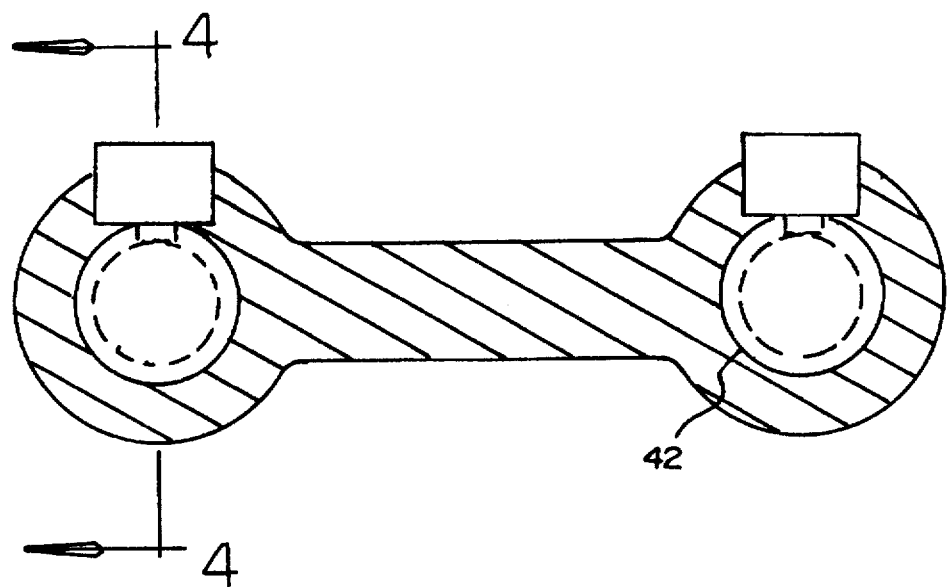
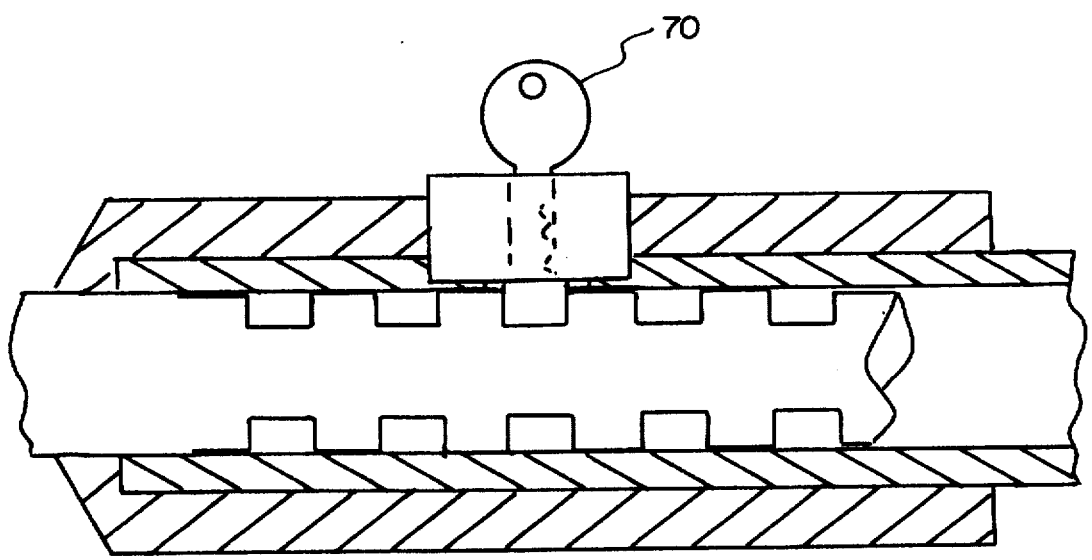
FIG 4

5,713,229

SECURITY DEVICE FOR STEERING WHEEL

BACKGROUND OF THE INVENTION

1. Field of the Invention

The present invention relates to a security device for a steering wheel and, more particularly, pertains to precluding the theft of automobiles, trucks and like vehicles due to the inability for steering.

2. Description of the Prior Art

The use of security devices for cars of various designs and configurations is known in the prior art. More specifically, security devices for cars of various designs and configurations heretofore devised and utilized for the purpose of precluding the theft of automobiles, trucks and like vehicles through various methods and apparatuses are known to consist basically of familiar, expected, and obvious structural configurations, notwithstanding the myriad of designs encompassed by the crowded prior art which has been developed for the fulfillment of countless objectives and requirements.

By way of example, the prior art in U.S. Pat. No. 5,327,753 to White discloses an anti-theft device for a plurality of vehicle steering wheel configurations.

U.S. Pat. No. 4,856,308 to Johnson discloses an automobile steering lock.

U.S. Pat. No. 5,113,674 to LiCausi discloses an anti-theft device adapted to be mounted to the steering wheel of a vehicle.

U.S. Pat. No. 5,007,259 to Mellard discloses an automobile anti-theft device.

U.S. Pat. No. Des. 348,207 to Chen discloses an automobile steering wheel lock.

Lastly, U.S. Pat. No. Des. 317,707 to Nordberg et al. discloses an automobile lock for attachment to a steering wheel and a steering wheel column-mounted gearshift lever.

In this respect, the security device for a steering wheel according to the present invention substantially departs from the conventional concepts and designs of the prior art, and in so doing provides an apparatus primarily developed for the purpose of precluding the theft of automobiles, trucks and like vehicles due to the inability for steering.

Therefore, it can be appreciated that there exists a continuing need for a new and improved security device for a steering wheel which can be used for precluding the theft of automobiles, trucks and like vehicles due to the inability for steering. In this regard, the present invention substantially fulfills this need.

SUMMARY OF THE INVENTION

In view of the foregoing disadvantages inherent in the known types of security devices for cars of various designs and configurations now present in the prior art, the present invention provides an improved security device for a steering wheel. As such, the general purpose of the present invention, which will be described subsequently in greater detail, is to provide a new and improved security device for a steering wheel and method which has all the advantages of the prior art and none of the disadvantages.

To attain this, the present invention essentially comprises a new and improved security device to preclude the theft of automobiles, trucks and like vehicles due to the inability for steering comprising, in combination, a steering wheel; a pair of elongated primary rods parallel with each other and positioned in contact with the upper surface of the steering wheel for automobiles, trucks and like vehicles adjacent to one side thereof at a first location with a pair of L-shaped members extending radially inward with respect to the position of contact with respect to the steering wheel, each L-shaped member including a downwardly extending portion and a radially outboardly extending portion for positioning beneath the steering wheel, each rod having an enlarged handle at its radially outboard end; an H-shaped support having a pair of support barrels with first ends attached to the inboard ends of the primary rods and a cross piece coupling the support barrels, each support barrel having a second end with a cylindrical bore in each second end; a pair of similarly shaped independent secondary rods, each formed with a plurality of concentric circumferential recesses, each secondary rod positionable within an associated bore of the barrels at a predetermined distance as a function of the circumference of the steering wheel, each rod having at its outboard end a fork-shaped member with upper and lower parallel fingers for spanning the upper and lower surfaces of the steering wheel at a second location diametrically opposed from the first location; a lock formed in each barrel with an associated interference member to contact and secure an associated second rod in a locking orientation; and a pair of keys turnable within the locks to advance and retract the interference member individually to and from an associated recess for locking and unlocking the steering wheel.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved security device for a steering wheel which has all the advantages of the prior art security devices for cars of various designs and configurations and none of the disadvantages.

It is another object of the present invention to provide a new and improved security device for a steering wheel which may be easily and efficiently manufactured and marketed.

It is a further object of the present invention to provide a new and improved security device for a steering wheel which is of a durable and reliable construction.

An even further object of the present invention is to provide a new and improved security device for a steering wheel which is susceptible of a low cost of manufacture with regard to both materials and labor, and which accordingly is then susceptible of low prices of sale to the consuming public, thereby making such security devices for cars of various designs and configurations economically available to the buying public.

Still yet another object of the present invention is to provide a new and improved security device for a steering wheel which provides in the apparatuses and methods of the prior art some of the advantages thereof, while simultaneously overcoming some of the disadvantages normally associated therewith.

Even still another object of the present invention is to preclude the theft of automobiles, trucks and like vehicles due to the inability for steering.

Lastly, it is an object of the present invention to provide a security device for a steering wheel comprising at least one elongated primary rod positioned in contact with the upper surface of a steering wheel adjacent to one side thereof at a first location with an L-shaped member extending radially inward with respect to the position of contact with respect to the steering wheel, the L-shaped member including a downwardly extending portion and a radially outboardly extending portion, the rod having an enlarged handle at its radially outboard end; an intermediate support having a pair of support barrels with a first end attached to the inboard end of the primary rod and a cross piece coupling the support barrels, each support barrel having a second end with a cylindrical bore in each second end; a pair of similarly shaped independent secondary rods, each formed with a plurality of concentric circumferential recesses, each secondary rod positionable within an associated bore of the barrels, each rod having at its outboard end a fork-shaped member with upper and lower parallel fingers for spanning the upper and lower surfaces of the steering wheel at a second location diametrically opposed from the first location; and a lock with an associated interference member to contact and secure an associated second rod in a locking orientation.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a cross-sectional view taken along line 3—3 of FIG. 2.

FIG. 4 is a cross-sectional view taken along line 4—4 of FIG. 3.

The same reference numerals refer to the same parts throughout the various Figures.

DESCRIPTION OF THE PREFERRED EMBODIMENT

Figure 1:
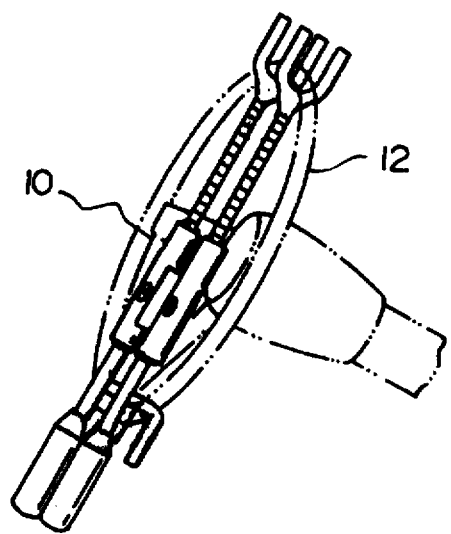
FIG. 1 is a perspective illustration of the preferred embodiment of the new and improved security device for a steering wheel constructed in accordance with the principles of the present invention.
Figure 2:
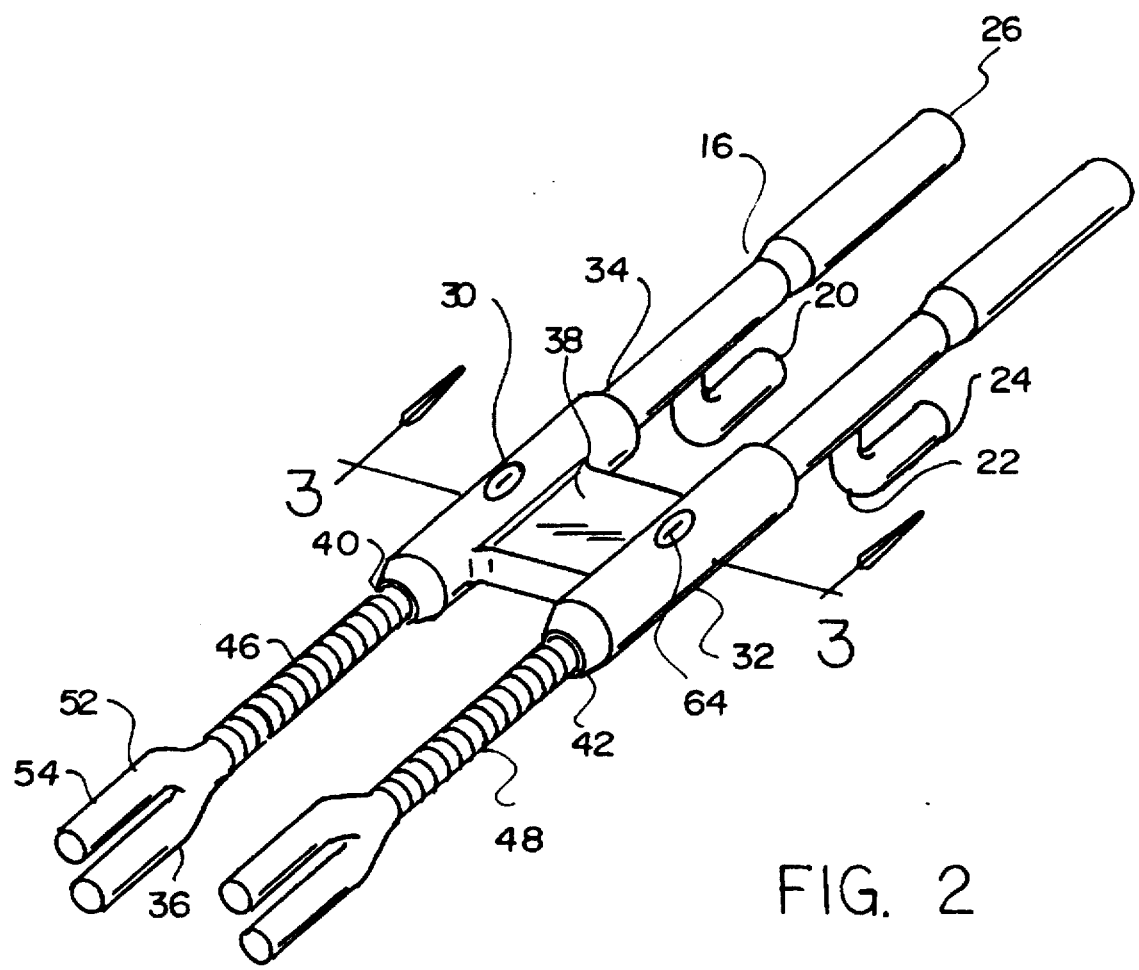
FIG. 2 is an enlarged perspective view of the security device shown in FIG. 1.

With reference now to the drawings, and in particular to FIG. 1 thereof, the preferred embodiment of the new and improved security device for a steering wheel embodying the principles and concepts of the present invention and generally designated by the reference numeral 10 will be described.

The present invention, the new and improved security device for a steering wheel, is a system 10 comprised of a plurality of components. In their broadest context, the components include a steering wheel, elongated rods, an H-shaped support, secondary rods, a lock, and a pair of keys. Each of the individual components is specifically configured and correlated one with respect to the other so as to attain the desired objectives.

The present invention is a system 10 which has as a primary component of the combination the steering wheel 12 of a car. Such steering wheel is of a conventional design which, if provided with an enlarged object thereon, can preclude the turning of the wheel and hence abate the possibility of theft.

The intended objective is attained through the use of a pair elongated primary rods 16. Such rods are of a similar construction and are oriented parallel with respect to each other. Such rods are adapted to be positioned in contact with the upper surface of the steering wheel, the steering wheel being that of either an automobile, truck or like vehicle. The elongated rods are adapted to be located adjacent to one side of the steering wheel at a first location, the bottom thereof as shown in FIG. 1.

The primary rods are formed with a pair of L-shaped members 20. Each L-shaped member extends and is positioned radially inboardly with respect to the position of contact with the steering wheel. More specifically, each L-shaped member includes a downwardly extending portion 22 and, formed integrally therewith, a radially outboardly extending portion 24. Such outboardly extending portion is for being positioned beneath the steering wheel. In addition, each rod has an enlarged handle 26 at its radially outboard end.

Next provided is an H-shaped support 30. The H-shaped support has a pair of support barrels 32. The support barrels each have a first end 34 permanently attached to the inboard ends 36 of the primary rods. In addition, a cross piece 38 couples the support barrels. Each support barrel also has a second end 40. A cylindrical bore 42 is formed in each such second end.

Cooperable with the primary bars and H-shaped supports are a pair of similarly shaped independent second rods 46. Each such second rod is formed with a plurality of circumferential recesses 48. Each such secondary rod is thus positionable within an associated bore of the barrels. Such secondary rods will extend interior of the bores to a predetermined distance as a function of the circumference of the steering wheel to be secured.

Each secondary rod has at its outboard end a fork-shaped member 52. Each fork-shaped member has an upper finger 54 and a lower finger 56. Such fingers are parallel with respect to each other. Such fingers are adapted for spanning the upper and lower surfaces of the steering wheel. Such spanning is done at a second location 58 which is diametrically opposed from the first location 60 by 180 degrees.

A lock 64 is formed in each barrel. Each lock has an associated interference member 66. The interference member is adapted to contact and secure an associated second rod in a locking orientation by being positioned within a preselected recess of its associated rod.

Associated with each lock is a key 70. There is thus provided a pair of keys. Such keys are turnable within the locks to advance and retract the interference member in the normal manner of a key and lock as is conventional in the art. The movement of the interference members of the locks are effected individually by the individual key. They are adapted for movement from an associated recess for locking and unlocking the steering wheel by retracting the secondary rods whereby the security device may be removed and by advancing the secondary rods whereby removal from the steering wheel cannot be effected without subsequent retraction.

Figure 5:
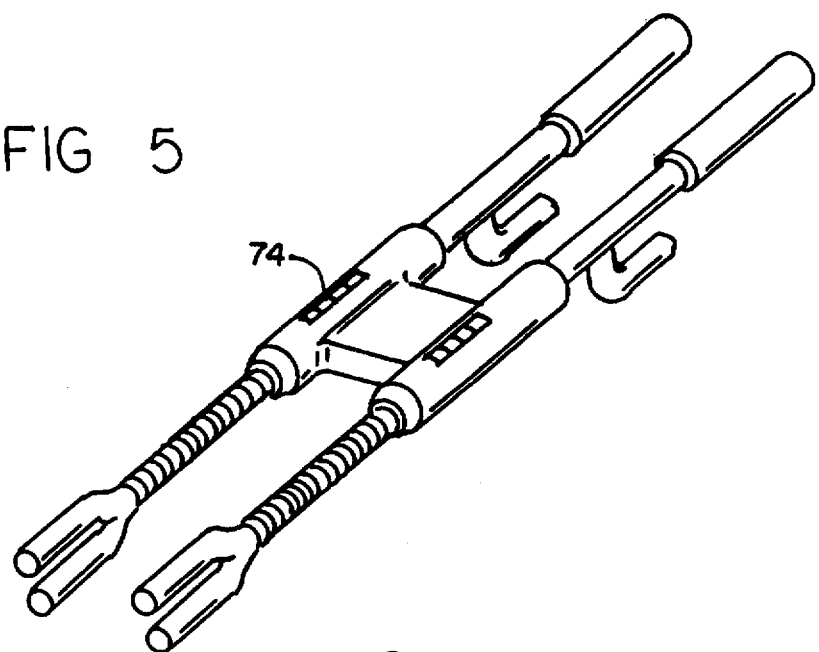
FIG. 5 is a perspective view of an alternate embodiment of the invention.

The first alternate embodiment of the invention is shown in FIG. 5. In such embodiment the device is essentially as that shown in FIGS. 1 through 4. The significant difference is that the key and associated lock is replaced by a pair of combination locks 74. One combination lock is provided for each barrel. Although the combination lock shown in FIG. 5 is illustrated as a four-digit member, it should be understood that a five, six or any other number of digits could readily be utilized. Although the locks could be correlated on with respect to the other so that the same combination may be used on either of the locks, separate combinations could readily be utilized for increased security.

Figure 6:
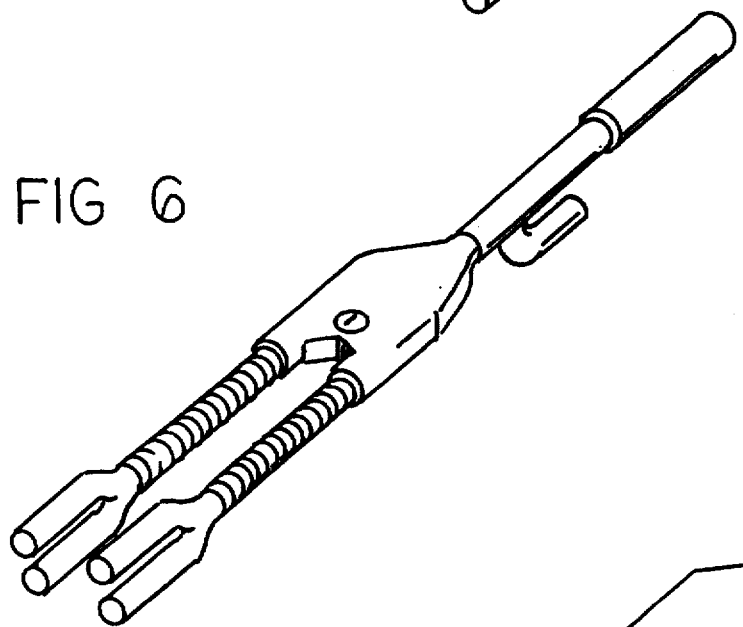
FIG. 6 is a perspective view of a further alternate embodiment of the invention.

FIG. 6 is an illustration of another alternate embodiment of the invention. In such alternate embodiment, the pair of primary rods are replaced by a single primary rod for coupling to the steering wheel at the first location. Similarly, the two locks are replaced by a single lock for greater simplicity of utilization.

Figure 7:
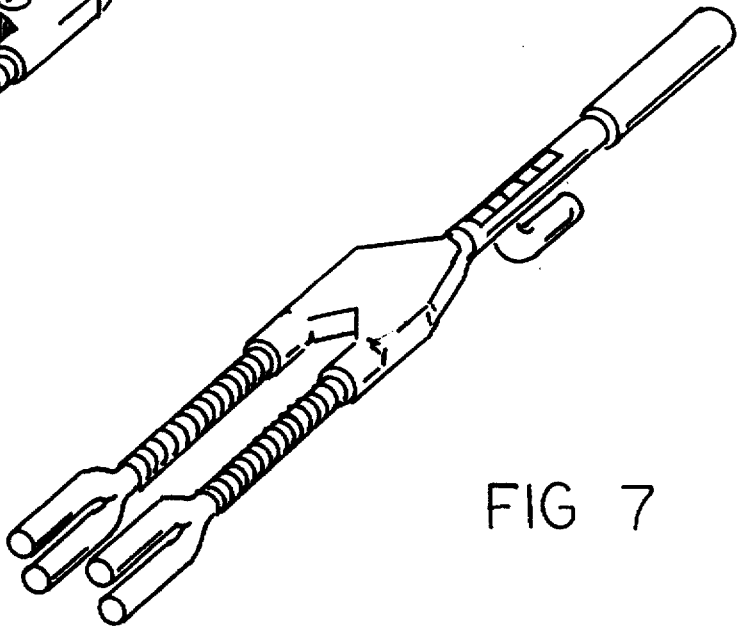
FIG. 7 is a perspective view of yet a further alternate embodiment of the invention.

The last alternate embodiment of the invention is shown in FIG. 7. In such alternate embodiment, the single key lock of FIG. 6 is replaced by a single combination lock.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A new and improved security device to preclude the theft of automobiles, trucks and like vehicles due to the inability for steering comprising, in combination:

a steering wheel;

a pair of elongated primary rods parallel with each other and positioned in contact with the upper surface of the steering wheel adjacent to one side thereof at a first location with a pair of L-shaped members extending radially inward with respect to a position of contact with respect to the steering wheel, each L-shaped member including a downwardly extending portion and a radially outboardly extending portion for positioning beneath the steering wheel, each rod having an enlarged handle at a radially outboard end thereof;

an H-shaped support having a pair of support barrels with first ends attached to inboard ends of the primary rods and a cross piece coupling the support barrels, each support barrel having a second end with a cylindrical bore in each second end;

a pair of similarly shaped independent secondary rods, each formed with a plurality of concentric circumferential recesses, each secondary rod positionable within an associated bore of the support barrels at a predetermined distance, each rod having a fork-shaped member disposed on an inboard end thereof, the fork-shaped member having upper and lower parallel fingers for spanning the upper and lower surfaces of the steering wheel at a second location diametrically opposed from the first location;

a lock formed in each of the support barrels with an associated interference member to contact and secure an associated second rod in a locking orientation; and a pair of keys turnable within the locks to advance and retract the interference member individually to an from an associated recess for locking and unlocking the steering wheel.

* * * * *